US008991494B2

(12) United States Patent
Willberg et al.

(10) Patent No.: US 8,991,494 B2
(45) Date of Patent: Mar. 31, 2015

(54) HYDRAULIC FRACTURING PROPPANTS

(75) Inventors: Dean Willberg, Tucson, AZ (US); Christopher N Fredd, Ashville, NY (US); Dina Andreevna Goloshchapova, Khabarovsk (RU); Sergey Mikhailovich MakaryChev-Mikhailov, St. Petersburg (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 376 days.

(21) Appl. No.: 13/059,090

(22) PCT Filed: Aug. 21, 2008

(86) PCT No.: PCT/RU2008/000566
§ 371 (c)(1),
(2), (4) Date: Mar. 29, 2011

(87) PCT Pub. No.: WO2010/021563
PCT Pub. Date: Feb. 25, 2010

(65) Prior Publication Data
US 2011/0180259 A1 Jul. 28, 2011

(51) Int. Cl.
E21B 43/267 (2006.01)
C09K 8/80 (2006.01)
(Continued)

(52) U.S. Cl.
CPC ... C09K 8/80 (2013.01); C09K 8/68 (2013.01); C09K 8/88 (2013.01); C09K 2208/08 (2013.01); C09K 2208/28 (2013.01); E21B 43/261 (2013.01); E21B 43/267 (2013.01)
USPC .................. 166/280.2; 166/308.1

(58) Field of Classification Search
None
See application file for complete search history.

(56) References Cited

U.S. PATENT DOCUMENTS

| 4,143,715 A | 3/1979 | Pavlich |
| 4,157,116 A | 6/1979 | Coulter |

(Continued)

FOREIGN PATENT DOCUMENTS

| CA | 2592799 | * 12/2007 |
| RU | 2166079 C1 | 4/2001 |

(Continued)

OTHER PUBLICATIONS

Packing of spheroids in three-dimensional space by random sequential addition J D Sherwood 1997 J. Phys. A: Math. Gen. 30 L839-L843.

(Continued)

*Primary Examiner* — Angela M DiTrani
*Assistant Examiner* — Anuradha Ahuja
(74) *Attorney, Agent, or Firm* — Rachel E. Greene; Tim Curington

(57) ABSTRACT

A method is given for treating a wellbore in a subterranean formation by hydraulic fracturing, slickwater fracturing, gravel packing, and the like, by using plate-like materials as some or all of the proppant or gravel. The plate-like materials are particularly useful in complex fracture systems, for example in shales. They may be used as from about 20 to about 100% of the proppant. Relative to conventional proppants, plate-like proppants demonstrate (a) enhanced crush resistance of the proppant due to better stress distribution among proppant particles, (b) diminished proppant embedment into formation fracture faces due to the greater contact surface area of proppant particles with the formation, (c) better proppant transport due to lower proppant settling rates, (d) deeper penetration into branched and fine fracture networks, and (e) enhanced proppant flowback control. Preferred plate-like proppants are layered rocks and minerals; most preferred is mica.

32 Claims, 5 Drawing Sheets

(51) Int. Cl.
*C09K 8/68* (2006.01)
*C09K 8/88* (2006.01)
*E21B 43/26* (2006.01)

(56) References Cited

U.S. PATENT DOCUMENTS

| | | | |
|---|---|---|---|
| 4,732,920 A | 3/1988 | Graham | |
| 4,809,783 A | 3/1989 | Hollenbeck | |
| 5,782,300 A | 7/1998 | James et al. | |
| 5,929,002 A | 7/1999 | Joyce et al. | |
| 6,059,034 A | 5/2000 | Rickards et al. | |
| 6,330,916 B1 | 12/2001 | Rickards et al. | |
| 6,406,789 B1 | 6/2002 | McDaniel et al. | |
| 6,599,863 B1* | 7/2003 | Palmer et al. | 507/219 |
| 6,605,570 B2 | 8/2003 | Miler et al. | |
| 6,632,527 B1 | 10/2003 | McDaniel et al. | |
| 6,725,930 B2 | 4/2004 | Boney et al. | |
| 6,776,235 B1* | 8/2004 | England | 166/271 |
| 6,828,280 B2* | 12/2004 | England et al. | 507/202 |
| 6,830,105 B2 | 12/2004 | Thesing | |
| 6,938,693 B2 | 9/2005 | Boney et al. | |
| 7,004,255 B2 | 2/2006 | Boney | |
| 7,066,260 B2 | 6/2006 | Sullivan et al. | |
| 7,178,596 B2* | 2/2007 | Blauch et al. | 166/280.2 |
| 7,228,904 B2 | 6/2007 | Todd et al. | |
| 7,237,609 B2 | 7/2007 | Nguyen | |
| 7,255,169 B2 | 8/2007 | van Batenburg | |
| 7,281,580 B2 | 10/2007 | Parker et al. | |
| 7,303,012 B2 | 12/2007 | Chan et al. | |
| 7,334,635 B2 | 2/2008 | Nguyen | |
| 7,350,572 B2 | 4/2008 | Fredd et al. | |
| 7,380,600 B2 | 6/2008 | Willberg et al. | |
| 7,406,789 B2 | 8/2008 | Story | |
| 7,595,280 B2 | 9/2009 | Welton et al. | |
| 7,931,966 B2 | 4/2011 | Burukhin et al. | |
| 2003/0054962 A1* | 3/2003 | England et al. | 507/117 |
| 2005/0126780 A1* | 6/2005 | Todd et al. | 166/279 |
| 2005/0130848 A1* | 6/2005 | Todd et al. | 507/200 |
| 2006/0065398 A1 | 3/2006 | Brannon | |
| 2006/0157243 A1* | 7/2006 | Nguyen | 166/280.2 |
| 2007/0131424 A1 | 6/2007 | Fripp | |
| 2007/0166541 A1* | 7/2007 | Smith et al. | 428/402 |
| 2007/0193745 A1 | 8/2007 | Fulton et al. | |
| 2007/0209795 A1 | 9/2007 | Gupta | |
| 2008/0000639 A1 | 1/2008 | Clark et al. | |
| 2008/0093073 A1 | 4/2008 | Bustos | |
| 2008/0135245 A1* | 6/2008 | Smith et al. | 166/280.2 |

FOREIGN PATENT DOCUMENTS

| | | |
|---|---|---|
| RU | 2191169 C1 | 10/2002 |
| RU | 2345115 C2 | 1/2009 |
| WO | 2007/076389 | 7/2007 |
| WO | 2008/018966 | 2/2008 |

OTHER PUBLICATIONS

Extended Search Report for the equivalent European patent application No. 08876799.1 issued on Oct. 2, 2012.
Office Action for the equivalent Chinese patent application No. 200880131218.3 issued on Apr. 3, 2013.
International Preliminary Report on Patentability dated Feb. 22, 2011 issued for International Patent Application No. PCT/RU2008/000566, filed on Aug. 21, 2008, 6 pages total.

* cited by examiner

HYDRAULIC FRACTURING PROPPANTS

BACKGROUND OF THE INVENTION

The Invention relates to stimulation of wells penetrating subterranean formations. More particularly, it relates to the use of plate-like materials as proppants in hydraulic fracturing. Most particularly, it relates to the placement of materials such as mica as proppants in very low conductivity fractures.

Hydraulic fracturing remains a key method of reservoir stimulation, providing a significant increase in oil and gas production. Substantial efforts today focus on the design of well treatments, in particular fracturing and propped fracturing, in order to achieve and retain high fracture conductivity. There is such variety in reservoirs and formations being stimulated today that there is much room for special techniques for fracture stimulation. While numerous fluids and propping agents are now available, a number of issues associated with even modern materials limit their applications in many non-conventional reservoirs.

The traditional approach for high strength proppants is to create particles, which usually have a shape close to spherical, and to use a relatively uniform particle size distribution. The general assumption is that the particulate material will be randomly packed within the fracture. The spherical shape is relatively strong under anisotropic loading in such a random pack, and the narrow monodispersed particle distribution gives high conductivity. However, application of spherical shape proppants and sands in some cases is not preferable, due to insufficient crush resistance and/or to proppant embedment into the formation. Both of these factors decrease proppant pack conductivity, and both can be the consequence of the spherical shape. Furthermore, high strength proppants usually have a high specific gravity, which significantly decreases proppant transportability. For proper placement of heavy proppant, the use of highly viscous fluids is required, which impacts stimulation economics.

It would be advantageous to have proppants characterized at the same time by high crush resistance, low embedment, and high transportability.

SUMMARY OF THE INVENTION

One embodiment of the Invention is a method of treating a subterranean formation penetrated by a wellbore involving preparing a slurry of a proppant and injecting the slurry down the wellbore; in the method, the proppant includes from about 20 to about 100% by weight of plate-like particles having a thickness of from about 1 to about 500 microns. The proppant may contain at least about 50% by weight of plate-like particles, preferably at least about 75% by weight of plate-like particles, most preferably at least about 90% by weight of the plate-like particles. The plate-like particles may include mica, talc or mixtures of these materials. The concentration of the plate-like particles in the slurry is preferably from about 0.0012 to about 2.4 kg/L, more preferably from about 0.0012 to about 0.06 kg/L. The slurry may optionally also contain a fluid loss additive. The plate-like particles may optionally be coated, for example with a resin or a wetting agent. Before use the plate-like particles may optionally be formed into a composite and the composite then comminuted.

Another embodiment of the Invention is a method of treating a subterranean formation penetrated by a wellbore including the steps of (a) injecting a thickened pad fluid, (b) injecting a thickened fluid slurry containing proppant including plate-like particles, (c) injecting a diverting material, and (d) repeating steps (a) through (c) at least once more. In this method, the proppant includes from about 20 to about 100% by weight of plate-like particles having a thickness of from about 1 to about 500 microns. The proppant may contain at least about 50% by weight of plate-like particles, preferably at least about 75% by weight of plate-like particles, most preferably at least about 90% by weight of the plate-like particles. The plate-like particles may include mica, talc or mixtures of these materials. The concentration of the plate-like particles in the slurry is preferably from about 0.0012 to about 0.12 kg/L. The slurry may optionally also contain a fluid loss additive. The diverting material may include fibers. The thickened fluid may also contain a friction reducer. Optionally, in successive sequences of steps (a) through (c) the concentration of plate-like proppant in the slurry in step (b) is varied. Optionally, in successive sequences of steps (a) through (c) the concentration of plate-like proppant in the proppant in step (b) is varied. Optionally, the steps of this embodiment are further followed by the steps of injecting a thickened pad fluid, injecting a thickened fluid slurry containing proppant containing plate-like particles, and injecting a thickened fluid containing a conventional proppant. The plate-like particles may optionally be coated, for example with a resin or a wetting agent. Before use the plate-like particles may optionally be formed into a composite and the composite then comminuted.

Yet another embodiment of the Invention is a method of treating a subterranean formation penetrated by a wellbore including the steps of (a) injecting a thickened pad fluid, (b) injecting a first thickened fluid slurry containing proppant containing plate-like particles, (c) injecting a second thickened fluid, and (d) repeating steps (a) through (c) at least once more. In the method, the plate-like particles make up from about 20 to about 100% by weight of the proppant and have a thickness of from about 1 to about 500 microns. The proppant contains at least about 50% by weight of plate-like particles, preferably at least about 75% by weight of plate-like particles, most preferably at least about 90% by weight of plate-like particles. The plate-like particles may include mica, talc or mixtures of these materials. The concentration of the plate-like particles in the slurry may be from about 0.06 to about 2.4 kg/L. Optionally, in successive sequences of steps (a) through (c) the concentration of plate-like proppant in the slurry in step (b) is varied. Optionally, in successive sequences of steps (a) through (c) the concentration of plate-like proppant in the proppant in step (b) is varied. Optionally, in some or all of steps (c) the second thickened fluid also contains conventional proppant. The plate-like particles may optionally be coated, for example with a resin or a wetting agent. Before use the plate-like particles may optionally be formed into a composite and the composite then comminuted.

Yet a further embodiment of the Invention is a method of treating a subterranean formation penetrated by a wellbore including the steps of (a) injecting a thickened pad fluid, (b) injecting a first thickened fluid slurry containing proppant including plate-like particles, and (c) injecting a second thickened fluid. Yet one more embodiment of the Invention is a method of treating a subterranean formation penetrated by a wellbore including the steps of (a) injecting a thickened pad fluid, (b) injecting a first thickened fluid slurry containing proppant containing plate-like particles, (c) injecting a second thickened fluid, and (d) repeating steps (b) and (c) at least once more. In these two methods, the plate-like particles make up from about 20 to about 100% by weight of the proppant and have a thickness of from about 1 to about 500 microns. The proppant contains at least about 50% by weight of plate-like particles, preferably at least about 75% by weight of plate-like particles, most preferably at least about 90% by weight of plate-like particles. The plate-like particles may include mica, talc or mixtures of these materials. The concentration of the plate-like particles in the slurry may be from about 0.06 to about 2.4 kg/L. Optionally, in successive sequences of steps (a) through (c) the concentration of plate-like proppant in the slurry in step (b) is varied. Optionally, in successive sequences of steps (a) through (c) the concentration of plate-like proppant in the proppant in step (b) is varied. Optionally, in some or all of steps (c) the second thickened fluid also contains conventional proppant. The plate-like particles may optionally be coated, for example with a resin or a wetting agent. Before use the plate-like particles may optionally be formed into a composite and the composite then comminuted.

DETAILED DESCRIPTION OF THE INVENTION

Figure 1:
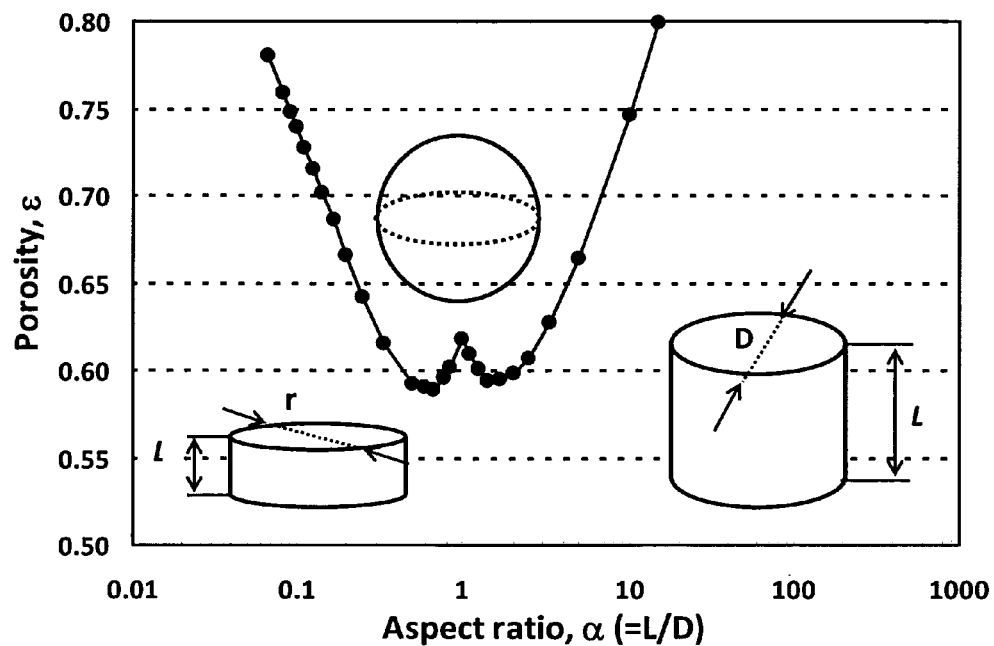
FIG. 1 shows porosity vs. aspect ratio calculated for various sizes of cylinders.

It should be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

Although the following discussion may be in terms of propped fracturing, the plate-like particles and methods of the Invention may be used in gravel packing, acid fracturing, slickwater fracturing treatments, and other oilfield treatments in which materials conventionally called gravel, sand, and proppant are used. The Invention may be described in terms of treatment of vertical wells, but is equally applicable to wells of any orientation. The Invention may be described primarily for use in shales, but it may be used in any formation material, for example carbonates, sandstones and coals. The invention may be used in fractures of any orientation. The Invention may be described for hydrocarbon production wells, but it is to be understood that the Invention may be used for wells for production of other fluids, such as water or carbon dioxide, or, for example, for injection or storage wells. The Invention may be described with aqueous fluids as proppant transport fluids, but any fluid may be used, for example slickwater, aqueous fluids viscosified with synthetic or natural polymers, aqueous fluids viscosified with non-polymeric viscosifiers such as viscoelastic surfactants, gelled oils, and any of the preceding used foamed or energized.

We have found that plate-like materials may be used as all of the proppant or as a significant portion of the proppant in certain stimulation treatments. The plate-like proppant shape has two main advantages, and a number of other advantages, over the conventional spheroid shape, especially for use in very fine fractures, for example branched fractures. Plate-like proppants demonstrate (a) enhanced crush resistance of the proppant due to better stress distribution among proppant particles and (b) diminished proppant embedment into formation fracture faces due to the greater contact surface area of proppant particles with the formation. Other benefits include (c) better proppant transportability due to the lower proppant settling rates, (d) deeper penetration into branched and fine fracture networks, (e) enhanced proppant flowback control, and (f) reduction of non-Darcy flow in fractures (as evidenced by lowered beta-factor). Furthermore, not only do plate-like particles have lower settling velocities than approximately spherical particles, for example sand, but mixtures of plate-like particles and spheres are also expected to have lower settling velocities than spheres alone.

A plate-like material (sometimes called a sheet material here) is defined as a particle having a thickness much less than its other dimensions, for example its length and width (breadth). Particle aspect ratios (diameter/thickness, length/thickness, or width/thickness) may be in the range of from about 5 to about 50 or more. (We define the aspect ratio as the ratio of the length or width to the thickness.) Any ratio of length to width may be used. The material may be chosen from a group including, as examples, natural and synthetic minerals, layered rocks (for example shale, slate, shist, mudstones, claystones, soapstones, mylonites, argillite, obsidian, phyllite, anthracite, breccias, conglomerates, coquina, flint, and others), minerals, plastics and polymers, metals, ceramics, glass and biomaterials. Individual particles may be made of multiple layers; in rocks and minerals these are sometimes called "books". The particle material can be either deformable or non-deformable. At least one surface is relatively flat, or may be deformed to become relatively flat (e.g., having a deviation in the surface height of less than the maximum dimension of the particle).

Plate-like proppants are particularly applicable in complex fracture networks, for example in shale gas reservoirs, where the conductivity specification may be only about 0.01 md-ft (about 0.003 md-m). They are also particularly suitable as proppant materials in soft formations having low permeability.

Plate-like materials have been used in oilfield fluids before, but if used as proppants they have been degradable or deformable (malleable, plastic, elastic, compressible), and/or used to form a partial monolayer, and/or have aspect ratios less than about 5 (see for example U.S. Patent Application Publication No. 20070193745, and U.S. Pat. Nos. 6,059,034, 6,330,916 and 7,228,904). Plate-like materials have also been used to reinforce synthetic proppants, for example composites, manufactured, for example, from plastics or other materials (see U.S. Patent Application Publication No. 20070209795, and U.S. Pat. Nos. 6,632,527, 7,228,904, 7,281,580 and 7,237,609). Plate-like materials have been added to proppant slurries to promote slurry transport and/or to inhibit proppant flowback (see for example U.S. Pat. Nos. 5,782,300 and 6,830,105). More commonly, they have been used as weighting agents, plugging materials, lost circulation materials, and fluid loss control additives (see for example U.S. Patent Application Publication No. 20060065398, and U.S. Pat. Nos. 5,929,002, 7,255,169, and 7,004,255).

The improvements and advantages of the Invention are due to the proppant particle shape. Sheet particles pack as a layered structure, in which particles have a significantly greater area of contact between one another, compared to a pack of spherical particles. A layered pack provides better stress distribution among the particles under formation closure stress; this leads to increased crush resistance of the proppant particles. The increased area of contact of the proppant particles with the fracture walls diminishes particle embedment into the formation. Essentially, therefore, the preferred shape is one that reduces point loading when the particles are confined between the two walls of a fracture. Plate-like shaped particles have been shown to have significantly lower settling rates in a fluid than spherical particles, which is beneficial in terms of proppant transportability. Furthermore, the small thickness of the sheet particles (for example, tens of microns) allows their deep penetration into microfracture networks; they can reach locations inaccessible to spherical proppant particles. As is known from the prior art, the sheet materials having plate-like particles can reduce or eliminate proppant flowback, which provides an additional advantage. In addition, flow along the flat plates in the multilayered pack results in less inertial losses than flow in a pack of spherical particles. Therefore, turbulent (non-Darcy) flows in sheet proppant packs are diminished and the beta-factor is reduced.

Ground mica minerals, for example muscovite, represent a particularly suitable example of the plate-like shaped proppants. The mica minerals exhibit an appropriate combination of physical and chemical properties, for example medium specific gravity, low bulk density, medium hardness, moderate water wettability, and high chemical and thermal stability.

In a preferred embodiment of the Invention, the proppant is made from or includes sheets or plates of sized natural or synthetic layered mineral or mineral-containing composite material. The preferred mineral is mica, most preferably muscovite. The latter is characterized by a specific gravity of 2.8 g cm$^{-3}$, a bulk density of less than about 0.5 g cm$^{-3}$, a typical sheet or plate thickness of about 20 microns, a hardness of about 2.5 to 3.0 (on the Mohs scale) or about 100 (by the Shore D test), and a water contact angle of about 23°. One aspect of mica and similar minerals is that the crystal structure is such that one layer of one platelet may be entirely composed of a single crystal. This gives such materials a high, tensile strength as compared to polycrystalline proppant materials. Muscovite mica is also known as "white mica" or "potassium mica". Muscovite withstands temperatures up to about 800° C., possesses high chemical stability, and is not subject to diagenesis under the conditions in which it is used in this Invention. A non-limiting list of other rocks and minerals that may occur in layered (sheet) form includes schist, shale (mudstone), phyllosilicates (sheet silicates), other micas such as fuchsite, hydro-muscovite, sericite, fluoromica, paragonite ("sodium mica"), glauconite, phlogopite ("magnesium mica"), biotite ("magnesium iron mica"), zinwaldite (or zinnwaldite) ("lithium iron mica"), lepidolite ("lithium mica"), lepidomelane ("iron mica"), clintonite and margarite, some forms of some clay minerals such as kaolinite, smectite, pyrophyllite, phengite, montmorillonite, saponite, vermiculite, hectorite, sepiolite, palygorskite (attapulgite), laponite, and illite, sodium silicate hydrates such as kanemite, grumantite, revdite, makatite, magadiite, kenyaite, and octosilicate, serpentine minerals such as antigorite, chrysotile, lizardite, and chrysotile, chlorite, talc, inosilicates, pyroxenoid minerals such as wollastonite, and rhodonite, amphibole minerals such as anthophyllite, tremolite, actinolite, grunerite, amosite, hornblende, and diopside, silica, flint (chert), novaculite, kyanite, zeolites (aluminosilicates), hydrotalcite, minerals of the sjogrenite-hydrotalcite group (carbonates), wulfenite (sulfates), asphalts (such as asphalt mesophases), and graphite. Some suitable materials are minerals; some are simply rocks. The important factor is that they be in a form that is characterized as lamellar, scaly, platy, flaky, slaty, schistose, layered, foliated, sheet, "book form", possessing fissility etc. We will use the term "plate-like" to designate this form. Some of these materials are brittle; some are flexible. Micas that have calcium substitution, instead of sodium or potassium are brittle; examples are clintonite and margarite.

Other suitable materials include layered double hydroxides, zirconium (IV) phosphates and phosphonates such as $\alpha$-Zr(HPO$_4$)$_2$.H$_2$O and $\alpha$-Zr(O$_3$PR)$_2$.nH$_2$O; layered manganese oxides such as feitknechtite and pyrochroite, birnessite and buserite types of materials, pillared layered manganese-based materials, manganese-based mesoporous materials, and manganese-based porous mixed oxides; layered metal chalcogenides such as metal dichalcogenides MX$_2$ (in which M=Sn, Cr, Hf, Ta, Ti, Zr, Nb, Mo, W or V; and X=S, Se or Te), metal trichalcogenides MX$_3$ (in which M=Nb or Zr; X=S, Se or Te), metal phosphorous trichalcogenides MPX$_3$ (in which M=Cd, Fe, Mg, Ca, Mn, Ni, V, Sn, Pb or Zn; X=S or Se), misfit layered compounds (RX)$_m$(MX$_2$)$_n$ (in which R=rare earth metals, Pb or Sn; M=Ta, Nb, V, Ti or Cr; X=S or Se), and ternary transition metal sulfides AMX$_2$ (in which A=Li, Na, K, Rb or Cs; M=Cr, Ti, V, Zr, Nb or Ta; X=S or Se), and other layered compounds such as h-BN, PbI$_2$, and BiI$_3$.

The plate-like proppant materials, for example natural or synthetic minerals or rocks, may be subjected to chemical or physical surface treatment in order to modify their properties, for example wettability, particle-to-particle friction or adhesion, etc. For example, the plate-like proppant may be treated with a surface active chemical (for example, an organosilane) that makes the particle oil wet.) The plate-like proppant, for example a natural or synthetic layered mineral or rock, may be coated with one or more of various resins known in the art. The plate-like material, for example mica, may first be incorporated into a composite paper, sheet, or board, for example by use of a resin which may then be cured or partially cured. The composite sheet may then be chopped and sieved, so that mica, or other, particles of the right dimension and size for hydraulic fracturing applications are produced. This process enables preparation of a material having a surface coating with a high degree of control. The sheets of plate-like material, for example mica, may be treated with dissimilar coatings on each side of the particle. For example, one side may be treated with a resin and the other side may be treated with either a water wetting or oil wetting material, or may not be treated at all.

The plate-like or sheet proppant may optionally be delivered to the treatment location as a suspension in a liquid. The liquid may contain thickening agents such as polymers, viscoelastic surfactants, laponite, etc., that help minimize proppant settling, and help keep the suspension in a pourable (pumpable) form.

The plate-like proppants and methods of the Invention may be used in hydraulic fracturing at the same concentrations and in the same fluids as conventional proppant. They may, however, be used at lower concentrations than conventional proppant, especially in slickwater applications. Proppant concentrations as measured on the surface may thus vary significantly, for example from about 0.0012 kg/L (0.01 lb per gallon (also called "pounds proppant added" or ppa)) of fluid to 2.4 kg/L (20 ppa), depending upon certain reservoir parameters such as formation permeability, fluid leak-off into the formation, etc. A preferred use of the plate-like proppant of the Invention is at very low concentrations, in slugs, to prop side fractures in shale. Proppant concentration may vary over the course of a single hydraulic fracturing job in much the same way as for conventional treatments. The concentration may vary continuously, or may be changed in discreet time or volume intervals, commonly called stages. At the beginning of a conventional hydraulic fracturing job, for example, proppant concentration may be as low as 0.06 kg/L (0.5 ppa) and then be ramped up to, for example, 2.4 kg/L (20 ppa) at the end of the treatment. The majority of conventional jobs will require a narrower span of proppant concentrations during the treatment, for example from 0.24 kg/L (2 ppa) to 1.8 kg/L (15 ppa).

The plate-like proppant is frequently used at concentrations lower than the concentration of conventional proppant in conventional treatments, and is optionally added at a concentration at which the surface area coverage of proppant within the fracture is less than a monolayer of the material. Such a treatment would be considered a slickwater treatment, although, of course, the term slickwater is not limited to partial monolayer designs. The concentration of plate-like proppant in such jobs would typically be similar to or lower than the concentration of conventional proppant in conventional slickwater jobs (about 0.06 kg/L (about 0.5 ppa)).

The plate-like proppants and methods of the Invention may be used in mixtures with conventional proppants, for example sand and ceramic beads. The concentration of the plate-like proppant in such mixtures will be from about 20 weight % of plate-like proppant and higher (up to 100%).

The plate-like proppant may also be injected in slugs, for example stages of plate-like proppant alternating with stages of conventional proppant and/or alternating with stages carrying no proppant and/or alternating with diversion stages. Some of these stages may optionally contain mixtures of plate-like proppant and conventional proppant; the concentrations of each may vary from stage to stage.

The carrier fluid may be any carrier fluid used to transport solids in slurries. Most commonly, in oilfield treatments, such carrier fluids will be aqueous fluids viscosified with natural or synthetic polymers or with non-polymeric viscosifiers such as viscoelastic surfactants; in slickwater treatments, the carrier fluid may be an aqueous fluid containing a friction reducer. Other fluids such as gases, liquefied gases, foams, energized fluids, and gelled oils may be used. Because of the desirable slow settling of plate-like materials in fluids, viscosities (and therefore viscosifier concentrations) may be lower than necessary for conventional proppants.

Figure 6:
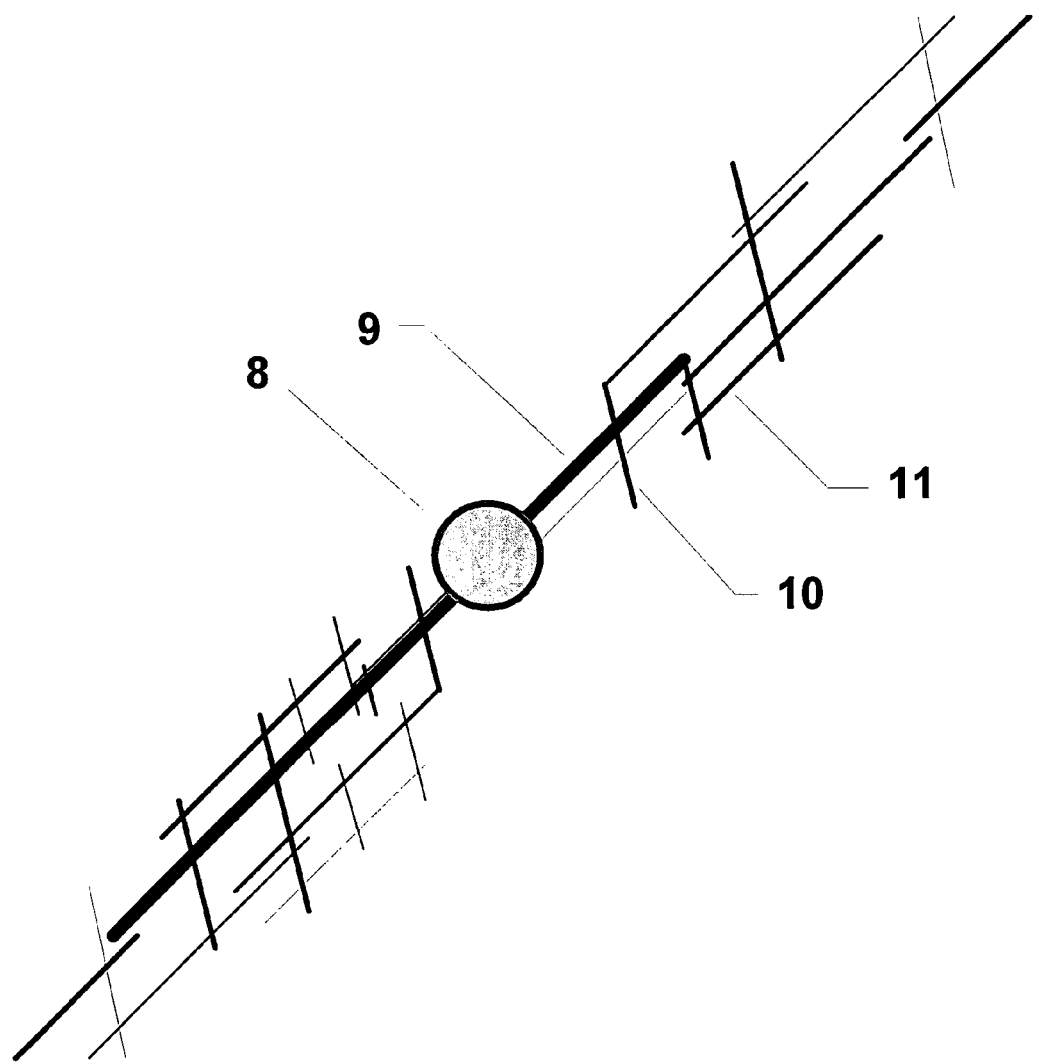
FIG. 6 depicts a complex fracture network

An important aspect of the plate-like proppant of the Invention is that it may be transported to fractures not accessible to conventional synthetic proppants and sands. Fractures in many formations, for example shales, may not simply be the two long planar straight "wings" commonly envisioned. In fact, there may be very complex fracture paths, multiple fractures, and branched fractures; and this may occur near the wellbore, far-field, or both. An important geometry is network fractures, which may result from a growing fracture encountering a natural fracture or flaw, or encountering a plane of weakness that is not parallel to, and may in fact be perpendicular to, the growing fracture. At this branch point, a new fracture begins. If one terms the initial fracture the primary fracture, then a fracture growing off the primary fracture may be termed a secondary fracture. If, as is common, the secondary fracture opens against a higher stress than the primary fracture, then the secondary fracture may be narrower than the primary fracture. The growing secondary fracture is likely to be unstable, because it opens up against a higher stress. Therefore, with continuing pumping, the fracture may encounter an occasion or opportunity to change direction again, and may begin a tertiary fracture that again opens against a lower closure stress or the minimum closure stress; the tertiary fracture may be wider than the secondary fracture. A propagating fracture may terminate at the branch point, or may continue. In either case, some or all of the flow path turns a corner, sometimes into a narrower fracture. An example of such a complex fracture network is shown in FIG. 6, which will be discussed further in Example 4.

The branch points are therefore choke points at which proppant is more likely to bridge off and prevent proppant transport deeper into the complex fracture network. A particular value of the plate-like proppant of the Invention is that the plates may be very easily transported and may line up in flow so that they may turn corners readily and be transported deep into complex fracture networks, for example branched fracture networks, even when flow rates become low, times become long, and flow paths become tortuous. This may be of value near the wellbore, far field, or both. In many treatments, it may be the nature of the choke points that determine the optimal properties of the proppant slurry, for example the optimal proppant size and shape. The conductivity required for successful propping of such branched complex, and possibly remote, fractures and/or microfractures may be as low as low as about 0.01 mD-ft (about 0.003 md-m).

The plate-like particles of the Invention, as the sole proppant or mixed with conventional proppant, are particularly suited to fracturing methods involving diverting agents. An Example of an especially suitable diverting agent is fibers. Non-limiting examples of degradable and non-degradable fibers forming plugs in subterranean formations and acting as diverting agents are described, for example in U.S. Pat. Nos. 7,350,572 and 7,380,600, and U.S. Patent Application Publication Nos. 2008/0000639 and 2008/0093073, all of which are hereby incorporated in their entirety. Fluids that may be used in embodiments of the present Invention include fluids containing no proppant, plate-like particles or diverting agent, for example pad fluids; fluids containing plate-like particles of the Invention; fluids containing conventional proppant; fluids containing diverter; fluids containing any two of proppant, plate-like particles and diverting agent; and fluids containing all three. These various fluids may be injected in any order, although a pad fluid is generally injected first. Each fluid may be injected many times. The concentrations of the components and the sizes of the stages may be varied. A typical non-limiting example is (a) a pad, then (b) plate-like particles, then (c) diverting agent, then repeat steps (b) and (c) one or more times, then (d) conventional proppant. In other embodiments, steps (a), (b) and (c) may be repeated multiple times in sequence or steps (a) and (b) may be repeated multiple times in sequence. The pad may contain low concentrations of any of the solid components (relative to the subsequent stages) and may be slightly viscosified (i.e. may be a slickwater fluid). Typically, the last stage contains conventional proppant larger than the plate-like particles to provide a high permeability flow path from the fracture network to the wellbore. Commonly the fluids in all stages are viscosified. The intent is to create as large a fracture network as possible and practicable with plate-like particles placed as deeply into that network as possible and practicable. It will be apparent to those skilled in the art that, given the teachings herein, many job designs are capable of achieving that end, and all such designs are within the scope of the Invention.

Propped fractures may be created in which there are regions in which fracture faces are "supported", in any orientation, by proppant (propped open) and regions in which there is no proppant. This may occur when slugs of carrier fluid containing proppant are alternated (either in time or in different perforations) with slugs without proppant to form a "room and pillar" type arrangement. This may also occur when the proppant concentration is less than that required to form at least a monolayer of proppant in the fracture. After the injection pressure is released, and the fracture closes, a number of phenomena may occur, depending upon the pressure, the geometry, and the shape and nature of the proppant. Proppant may be crushed (which may, of course, happen in fully packed fractures, too). If the proppant is harder than the rock, individual proppant particles may become embedded in the fracture face (embedment). Plate-like proppant would embed less easily because stress concentration is minimized, or softer plate-like proppant could be used for the same extent of embedment. (However, if the proppant is too soft, it could be deformed too much and allow the fracture faces to approach one another.) In a room and pillar arrangement, the pillar could become embedded in the rock, called "punching", or the unsupported regions could flow towards one another, called "pinching", or both. Any of these phenomena would reduce the fracture conductivity. Using plate-like proppant reduces the occurrence or severity of some of these deleterious phenomena; choosing the right material with the right properties also may help to reduce the occurrence or severity of some of these phenomena.

Muscovite mica is a particularly suitable plate-like proppant material, due to a combination of its physical and chemical properties, but especially because of its shape. There are several benefits provided by the shape. FIG. 1 (adapted from Sherwood, J. D., *J. Phys. A: Math. Gen.* 30 (1997) L839-L843) shows the porosity ratio of cylindrical particles in a pack as a function of aspect ratio; the porosity of a pack of plates can be significantly higher than that of a pack of spheres (note, however, that these porosity data do not take closure stress into account). Muscovite mica would fall near the left hand edge of the curve in FIG. 1; spheres would be in the middle; cylinders would be on the right hand side. The settling velocity of plates is much smaller compared to that of spheres of the same size (see data in the Experimental section below) due to the larger drag coefficient and glided settling of plates. Since the porosity of the pack is larger, mica and similar materials have significantly lower bulk densities in fluid slurries than do sand and similar conventional proppant beads. Consequently, a given weight of plate-like proppant occupies a larger volume than the same weight of sand, even after complete settling, so the fracture height of a fracture propped with the given weight of plate-like proppant is much larger as well. Furthermore, plates are believed to be placed into a microfracture with the long dimensions parallel to the fracture face and the one very low dimension perpendicular to the fracture face. In that orientation, individual proppant particles and proppant packs of plate-like proppants are subject to a lesser degree of embedment, and packs of such plates are less susceptible to proppant flowback due to the distribution of stress in the stacks.

Suitable thicknesses of the plate-like proppants of the Invention range from about 1 to about 500 microns. The preferred thickness is from about 10 to about 300 microns; the most preferred thickness is from about 20 to about 200 microns.

Other suitable materials include low density polyethylene, phenolic resins, polyvinyl chloride, polyethylene terephthalate, fish scales, crushed shellfish shells or egg-shells, metals, ceramics and novoloid phenol-aldehyde materials cured by acid-catalyzed cross-linking of novolac resin. Particularly suitable are certain metals and crosslinked polymers that have been work-hardened, that is, in which creep and long term deformation have been arrested, making them essentially non-deformable and non-creeping; for polymers these are basically thermosetting plastics.

Useful plate-like proppants may be prepared from composite materials such as shredded mica/resin papers, and shredded mica/epoxy papers. These materials contain at least one non-ductile component, for example mica, flint, and other flakey minerals. Commercially available mica sheets and papers are made, for example, with silicones, epoxies, shellacs and other materials. They may be rigid or flexible. Mica tapes are commercially available with backings made of glass fibers, polyester fibers, polyethylene, polypropylene, and other materials. Plate-like proppants of the Invention may be made from any of these and similar materials by known methods, for example chopping, shredding, grinding, slicing, and the like.

The plate-like materials may be chemically or physically modified in other ways. For example they may be coated with sizing agents that assist in their dispersion in water, and/or they may be coated with free-flow additives that help them flow as a dry bulk material. Other treatments known in the art of handling high surface area granular materials may also be used.

The plate-like proppants of the Invention are advantageously used in conjunction with diversion steps. A particularly suitable diversion technique is one in which temporary, degradable, plugs are formed, for example with degradable fibers, in order to stimulate regions separate from the main fracture. Such plugs may be placed, for example, near the wellbore or deep in a fracture network. When tight shale is the target formation, treatments are commonly slickwater. A typical treatment might include the following steps: slickwater pad, slickwater plus plate-like proppant to prop fracture network, diversion to block propped side channels and increase the net pressure in order to open new side channels, then repeat (pad, plate-like proppant, diversion) most typically multiple times, followed by a typical slickwater design with conventional proppant (generally 100 mesh or sand in shale) to prop the primary fracture and to connect all the secondary and/or tertiary fracture networks, in particular those that have been propped with plate-like proppant, to the wellbore. Here, the repeated sequence of pad, plate-like proppant and diversion creates significant fracture surface area in shale formations (which would otherwise not be conductive in the absence of plate-like proppant material) that is hydraulically connected to the wellbore via the main fracture channel.

The present Invention may be understood further from the following examples.

Samples of muscovite mica were ground and sieved in the laboratory, wand size ranges of 20/40, 40/70 and 70/140 (roughly corresponding to 100 mesh) were used in some of the experiments. Commercial muscovite mica samples, obtained from Minelco Specialties Limited, Derby, UK, were also used. They were designated MD150 and MD250; the number in the code represents the average flake diameter in microns. The thickness of these mica particles was about 20-25 microns. The manufacturer described the material as dry ground, highly delaminated potassium aluminum silicate Muscovite Mica flakes having a melting point of about 1300°

C., a specific gravity of about 2.8, a pH of about 9 as a 10% slurry in water, and as being flexible, elastic, tough, and having a high aspect ratio. The MD150 is 99.9% smaller than 250 microns, 75-90% smaller than 106 microns, and 30-65% smaller than 53 microns; the MD250 is 99.9% smaller than 250 microns, 10-50% smaller than 125 microns, and 0-15% smaller than 63 microns.

Example 1

Figure 2:
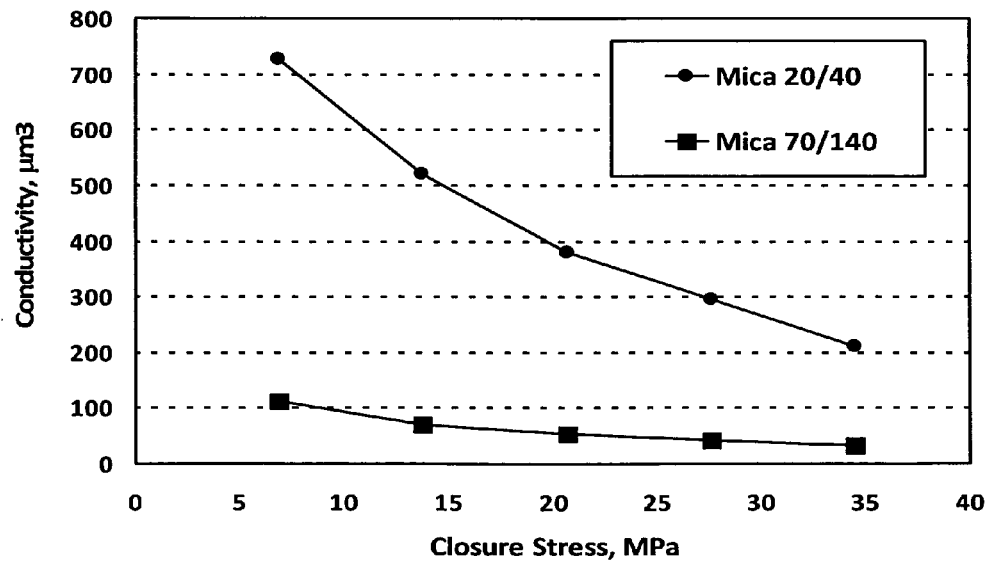
FIG. 2 shows experimental proppant pack conductivities of plate-like proppants of the Invention at various closure pressures.

FIG. 2 illustrates proppant pack conductivities of ground muscovite mica at a loading of 2.45 kg/m² (0.5 lb-ft$^{-2}$) between Ohio sandstone cores at 82° C. (180° F.)) under closure stresses of 6.9, 13.8, 20.7, 27.6, and 34.5 MPa (1000, 2000, 3000, 4000 and 5000 psi). The results were obtained in the laboratory in short term tests using API method RP-61.

Example 2

Figure 3:
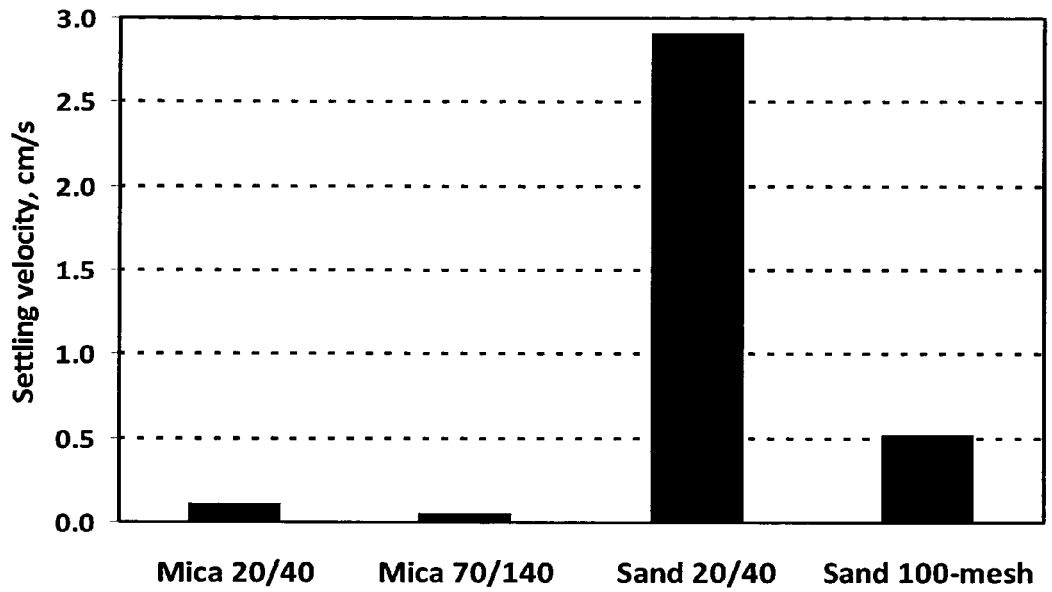
FIG. 3 gives the experimental settling velocities of sand and of plate-like proppants of the Invention in slickwater.
Figure 4:
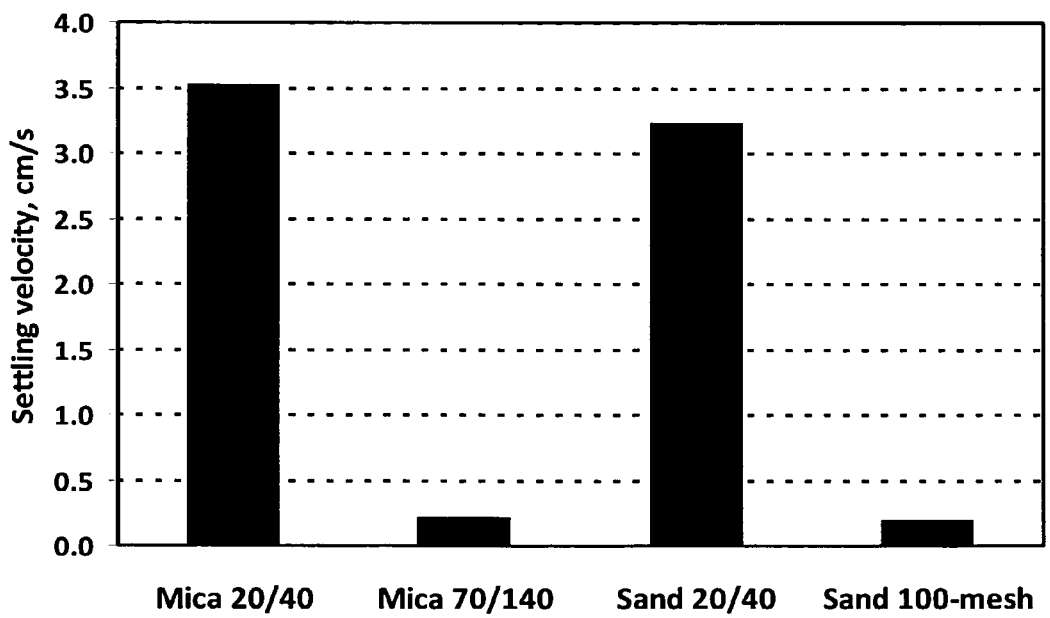
FIG. 4 gives settling velocities of sand and of plate-like proppants of the Invention in slickwater calculated according to Stokes Law.

FIG. 3 shows the experimental settling velocity of sand (at a concentration of 0.06 kg/L (0.5 lb/gal)) and muscovite mica particles (at a concentration of 0.036 kg/L (0.3 lb/gal)) of different sizes in slickwater containing 1 L/kL (1 gal/1000 gal) of a friction reducer containing about 50% polyacrylamide. FIG. 4 gives settling velocities for the same types of particles calculated according to Stokes law, using specific gravities of 2.80 for mica and 2.65 for sand, and assuming a fluid viscosity of 10 cp. The plate-like particles settle at rates up to twenty times slower than theoretically predicted for spherical particles.

Example 3

Figure 5:
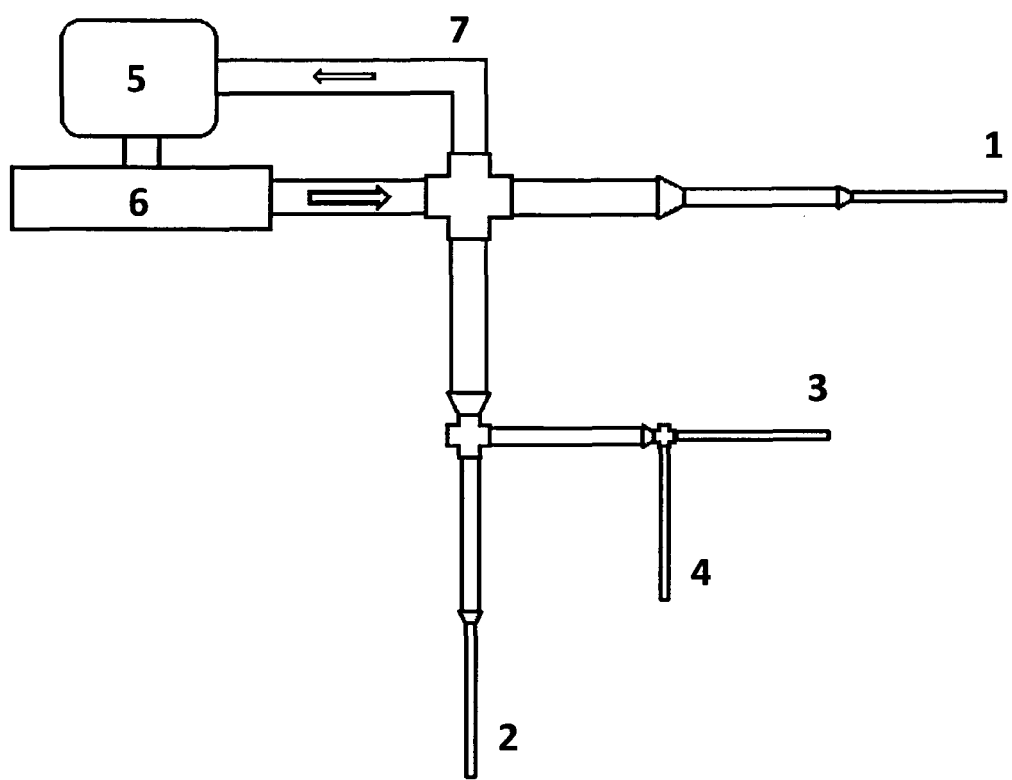
FIG. 5 shows a schematic of the apparatus used to study particle transportability.

Transport properties of sand and mica were studied under dynamic conditions in the manifold system shown in FIG. 5. The system included a horizontal manifold having four outlets [1-4] made of Swagelok tubing having outer diameters of from 6.35 to 25.4 mm (0.25-1 in), equipped with a slurry tank [5] and a pump [6] (Moyno) providing a slurry flowrate up to 100 L/min. This manifold mimics a complex fracture network, for example in shale. The side flowloop [7] allowed reduction of the slurry flowrate down to 10 L/min without proppant settling in the pump. The original slurry consisted either of a linear gel containing 2.4 g/L (20 pounds per thousand gallons) of guar or of slickwater containing 1 L/kL (1 gal/1000 gal) of polyacrylamide friction reducer; each fluid contained 0.06 kg/L (0.5 lb/gal) of proppant. Samples of slurry were collected from the outlets and analyzed for proppant content. Percent values shown in the Table below indicate the relative amounts of proppant transported to the corresponding outlets. Recovery values indicate the total amount of transported proppant, relative to the total amount of proppant introduced into the manifold. The mica used was MD250. The mass of proppant coming out of the manifold through different outlets was weighed. Outlet number 1 is easiest for suspended solids to reach; outlet number 2 is next easiest, then outlet number 3; outlet number 4 is the most difficult for suspended solids to reach and is most representative of difficult-to-reach portions of a complex fracture. Typical results are shown in Table I. In the linear gel or in the slickwater, almost none of the 20/40 sand reached outlet 4; about half as much of the 50/140 sand reached that outlet as should have, and nearly all of the expected mica reached the outlet. In these experiments, mica demonstrated almost quantitative transport in either linear gel or slickwater.

TABLE I

| OUTLET | LINEAR GEL | | | | SLICKWATER | | |
|---|---|---|---|---|---|---|---|
| | 20/40 Sand | 50/140 Sand | MD250 Mica | Pure Gel | 50/140 Sand | MD250 Mica | Pure Slick-water |
| %1 | 38.4 | 36.8 | 39.2 | 38.1 | 36.3 | 40.7 | 38.4 |
| %2 | 35.4 | 33.8 | 33.2 | 31.9 | 34.0 | 31.1 | 31.3 |
| %3 | 25.6 | 24.1 | 18.5 | 20.2 | 24.5 | 19.3 | 20.0 |
| %4 | 0.6 | 5.3 | 9.1 | 9.7 | 5.2 | 8.9 | 10.4 |
| % Recovery | 62 | 81 | 94 | — | 54 | 87 | — |

Example 4

FIG. 6 shows an example of the type of fracture network that might form in hydraulic fracturing of a shale. A wellbore penetrating a formation is depicted by [8]. Two wings of a primary fracture are formed by pumping a fluid at pressure through the wellbore and into the formation. These wings are normally formed in the direction of the least closure stress. One wing is shown by [9]. If a growing fracture encounters a new plane of weakness, a new secondary fracture may form; an example of which is shown by [10]. If possible, a tertiary fracture, shown by [11], may form in the initial fracture direction. (This diagram is for illustrative purposes only; many other arrangements and orientations are possible in a complex fracture network . . . . )

Figure 7:
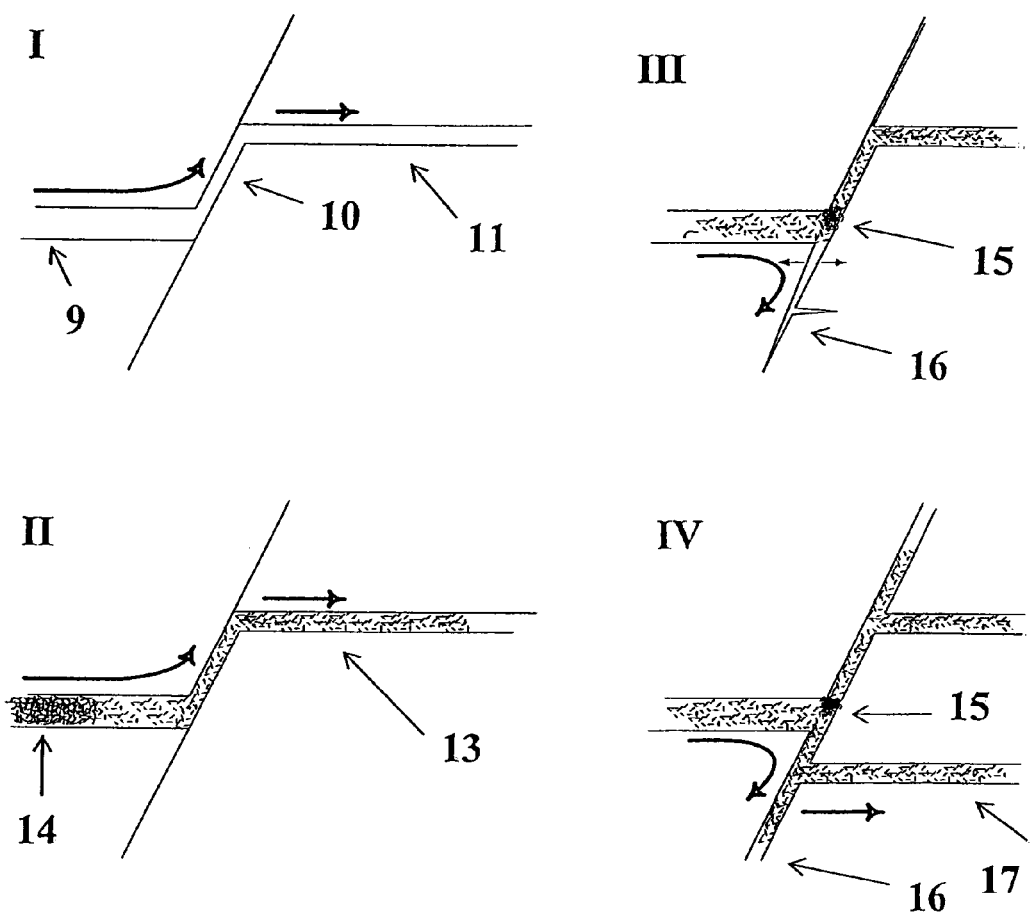
FIG. 7 shows how the method of the Invention proceeds in a forming complex fracture network.

FIG. 7 shows one way in which the method of the Invention may be used. Panel I of FIG. 7 shows fluid flowing along a primary fracture [9], forming a narrower secondary fracture [10], and then forming a tertiary fracture [11] wider than the secondary fracture. (Fluid flow is shown by the heavy arrows.) This network might be formed by injection of a pad fluid. Panel II shows injection of a fluid [13] containing plate-like particles of the Invention flowing into the fracture network; the plate-like particles are able to navigate the corners in the flow path and can pass through the narrower fracture. A slug of a diverting material, for example a fiber, is then injected; a slurry of this material is shown at [14]. Panel III shows this material having formed a plug [15] at the choke point where the narrower secondary fracture grows off the primary fracture. Flow is inhibited along the original flow path, so a new fracture [16] forms. As injection of the plate-like particles continues, they flow into the new fracture; yet another new fracture [17] forms where flow may continue in the direction of the primary fracture. This process may be repeated many times by injecting subsequent diverting material slugs. The diverter slug may contain plate-like particles. Alternatively, or in addition, the fluid containing the plate-like material may also contain diverting material, for example at low concentration; the diverting material slowly accumulates at the choke point until diversion occurs.

The invention claimed is:
1. A method of treating a subterranean formation penetrated by a wellbore comprising:
   preparing a slurry of a proppant;
   injecting the slurry down the wellbore; and
   maintaining the proppant in fractures formed in the subterranean formation, wherein the proppant comprises at least about 50% by weight of plate-like particles having a thickness of from about 1 to about 500 microns and a particle aspect ratio of at least 5; wherein the plate-like particles are selected from the group consisting of mica, talc and mixtures thereof.

2. The method of claim 1 wherein the proppant comprises at least about 75% by weight of plate-like particles.

3. The method of claim 1 wherein the proppant comprises at least about 90% by weight of plate-like particles.

4. The method of claim 1 wherein a concentration of the plate-like particles in the slurry is from about 0.0012 to about 2.4 kg/L.

5. The method of claim 1 wherein a concentration of the plate-like particles in the slurry is from about 0.0012 to about 0.06 kg/L.

6. The method of claim 1 wherein the slurry further comprises a fluid loss additive.

7. The method of claim 1 wherein the plate-like particles are coated.

8. The method of claim 1 wherein the plate-like particles are incorporated in a composite material and the composite material is then comminuted.

9. A method of treating a subterranean formation penetrated by a wellbore comprising:
   (a) injecting a thickened pad fluid,
   (b) injecting a thickened fluid slurry comprising proppant comprising plate-like particles selected from the group consisting of mica, talc and mixtures thereof for holding open a plurality of fractures in the subterranean formation,
   (c) injecting a diverting material, and
   (d) repeating (a) through (c) at least once more;
   wherein the plate-like particles comprise at least about 50% by weight of the proppant and have a thickness of from about 1 to about 500 microns and a particle aspect ratio of at least 5.

10. The method of claim 9 wherein the proppant comprises at least about 75% by weight of plate-like particles.

11. The method of claim 9 wherein the proppant comprises at least about 90% by weight of plate-like particles.

12. The method of claim 9 wherein a concentration of the plate-like particles in the slurry is from about 0.0012 to about 0.12 kg/L.

13. The method of claim 9 wherein the diverting material comprises fibers.

14. The method of claim 9 wherein the thickened fluid slurry comprises a friction reducer.

15. The method of claim 9 wherein in successive sequences of elements (a) through (c) a concentration of plate-like proppant in the slurry in (b) is varied.

16. The method of claim 9 wherein in successive sequences of elements (a) through (c) a concentration of plate-like proppant in the proppant in (b) is varied.

17. The method of claim 9 further comprising:
   (a) injecting a thickened pad fluid,
   (b) injecting a thickened fluid slurry comprising proppant comprising plate-like particles, and
   (c) injecting a thickened fluid comprising a conventional proppant.

18. The method of claim 9 wherein the plate-like particles are coated.

19. The method of claim 9 wherein the plate-like particles are incorporated in a composite material and the composite material is then comminuted.

20. A method of treating a subterranean formation penetrated by a wellbore comprising:
   (a) injecting a thickened pad fluid,
   (b) injecting a first thickened fluid slurry comprising proppant comprising plate-like particles selected from the group consisting of mica, talc and mixtures thereof able to hold open a plurality of fractures in the subterranean formation to facilitate production from the wellbore,
   (c) injecting a second thickened fluid, and
   (d) repeating (a) through (c) at least once more;
   wherein the plate-like particles comprise at least about 50% by weight of the proppant and have a thickness of from about 1 to about 500 microns and a particle aspect ratio of at least 5.

21. The method of claim 20 wherein the proppant comprises at least about 75% by weight of plate-like particles.

22. The method of claim 20 wherein the proppant comprises at least about 90% by weight of plate-like particles.

23. The method of claim 20 wherein a concentration of the plate-like particles in the slurry is from about 0.06 to about 2.4 kg/L.

24. The method of claim 20 wherein in successive sequences of elements (a) through (c) a concentration of plate-like proppant in the slurry in (b) is varied.

25. The method of claim 20 wherein in successive sequences of elements (a) through (c) a concentration of plate-like proppant in the proppant in (b) is varied.

26. The method of claim 20 wherein in some or all of elements (c) the second thickened fluid further comprises proppant.

27. The method of claim 20 wherein the plate-like particles are coated.

28. The method of claim 20 wherein the plate-like particles are incorporated in a composite material and the composite material is then comminuted.

29. A method of treating a subterranean formation penetrated by a wellbore comprising:
   (a) injecting a thickened pad fluid,
   (b) injecting a first thickened fluid slurry comprising proppant comprising plate-like particles selected from the group consisting of mica, talc and mixtures thereof which maintain a plurality of fractures in the subterranean formation, and
   (c) injecting a second thickened fluid;
   wherein the plate-like particles comprise at least about 50% by weight of the proppant and have a thickness of from about 1 to about 500 microns and a particle aspect ratio of at least 5.

30. The method of claim 29 further comprising repeating (b) and (c) at least once more.

31. The method of claim 29 wherein the plate-like particles are coated.

32. The method of claim 29 wherein the plate-like particles are incorporated in a composite material and the composite material is then comminuted.

* * * * *

UNITED STATES PATENT AND TRADEMARK OFFICE
CERTIFICATE OF CORRECTION

PATENT NO. : 8,991,494 B2  Page 1 of 1
APPLICATION NO. : 13/059090
DATED : March 31, 2015
INVENTOR(S) : Dean Willberg et al.

It is certified that error appears in the above-identified patent and that said Letters Patent is hereby corrected as shown below:

Title page, (75) Inventors:

Fourth Inventor's name is changed from "Sergey Mikhailovich MakaryChev-Mikhailov" to --Sergey Mikhailovich Makarychev-Mikhailov--.

Signed and Sealed this
Twenty-sixth Day of January, 2016

Michelle K. Lee
*Director of the United States Patent and Trademark Office*